Dec. 13, 1938.  H. A. HICKS  2,139,750
MOTOR VEHICLE
Filed Oct. 21, 1935  7 Sheets-Sheet 1
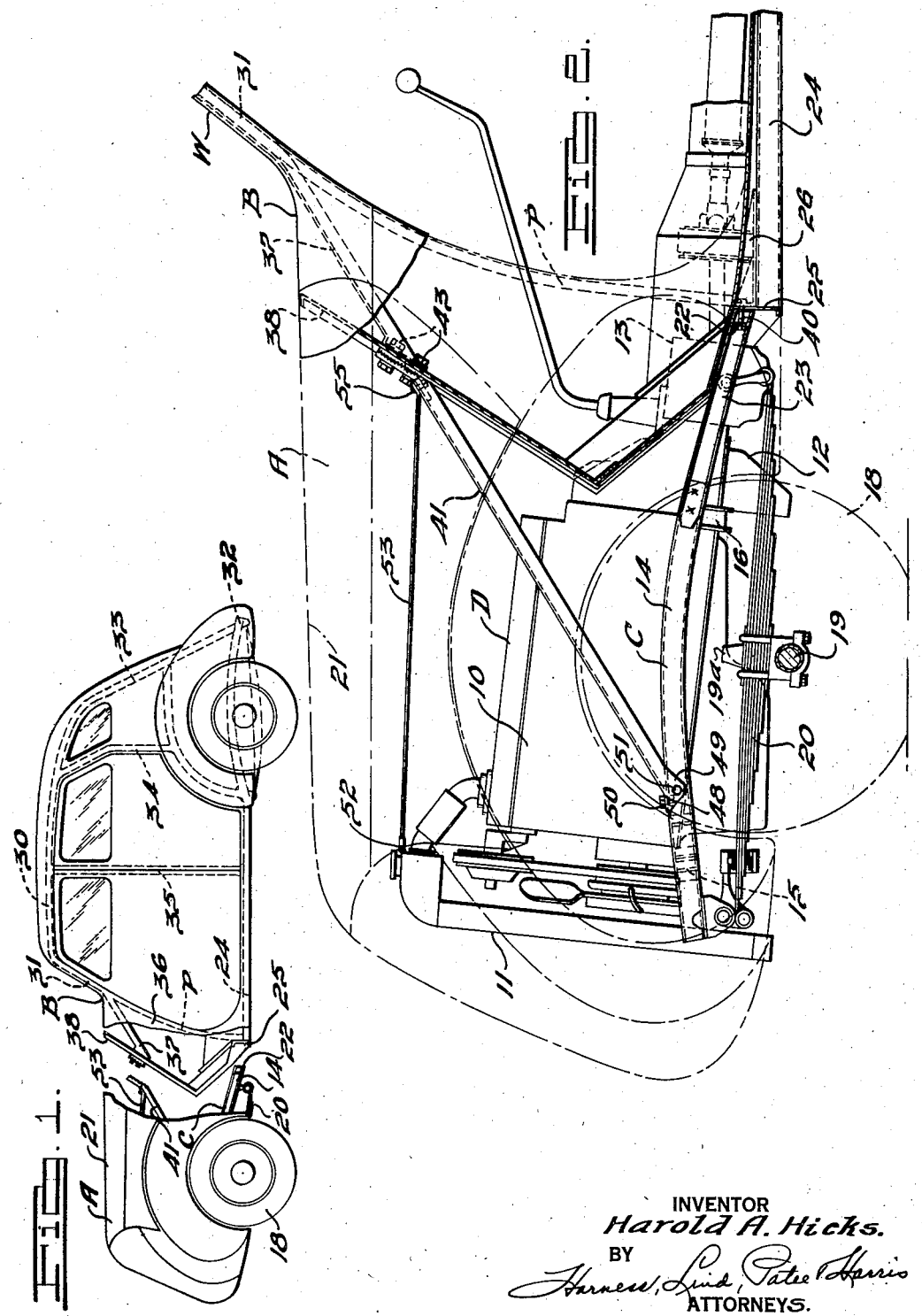
INVENTOR
*Harold A. Hicks.*
BY
*Harness, Dind, Patee & Harris*
ATTORNEYS.

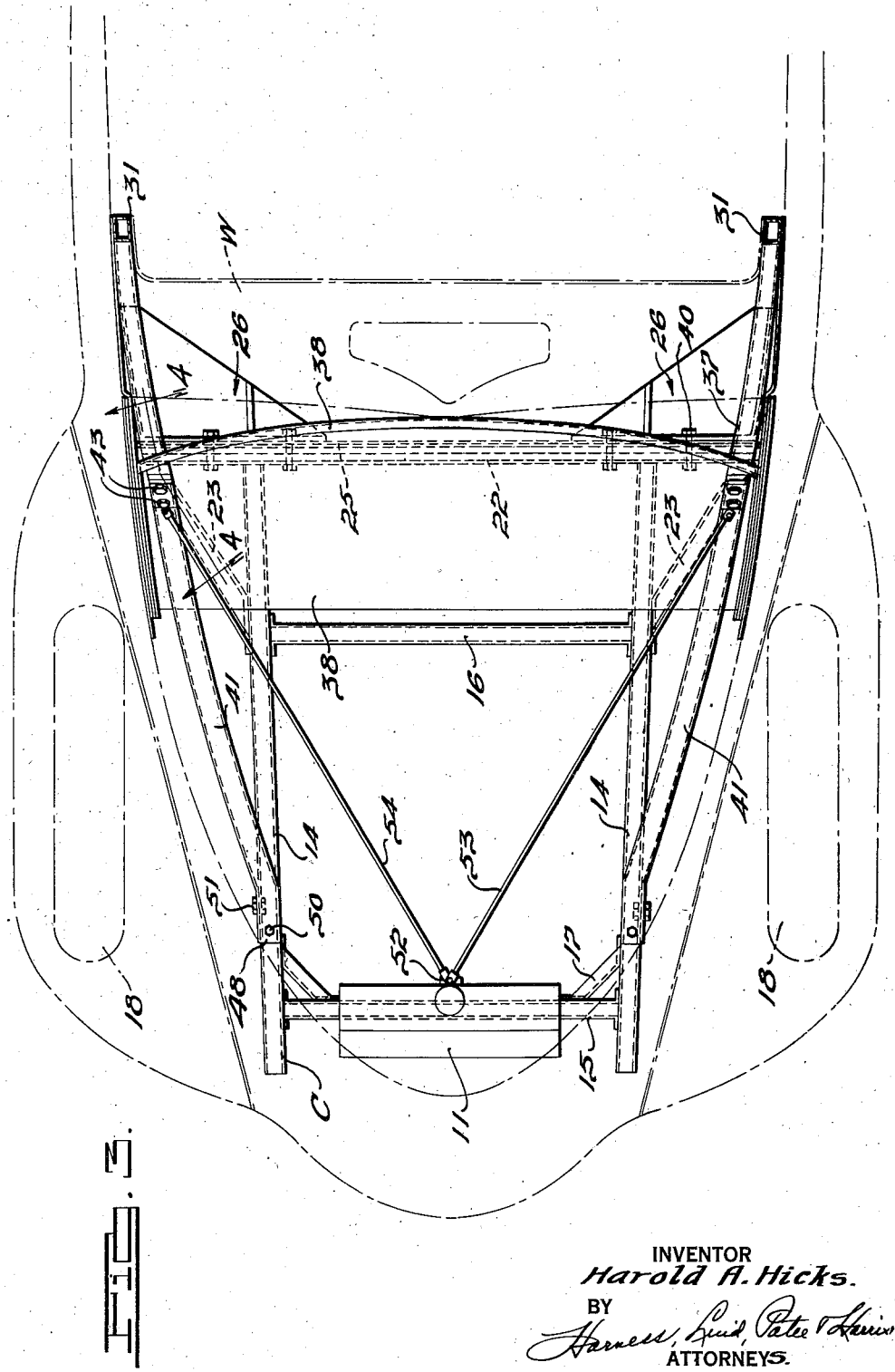

Dec. 13, 1938. H. A. HICKS 2,139,750
MOTOR VEHICLE
Filed Oct. 21, 1935 7 Sheets-Sheet 3
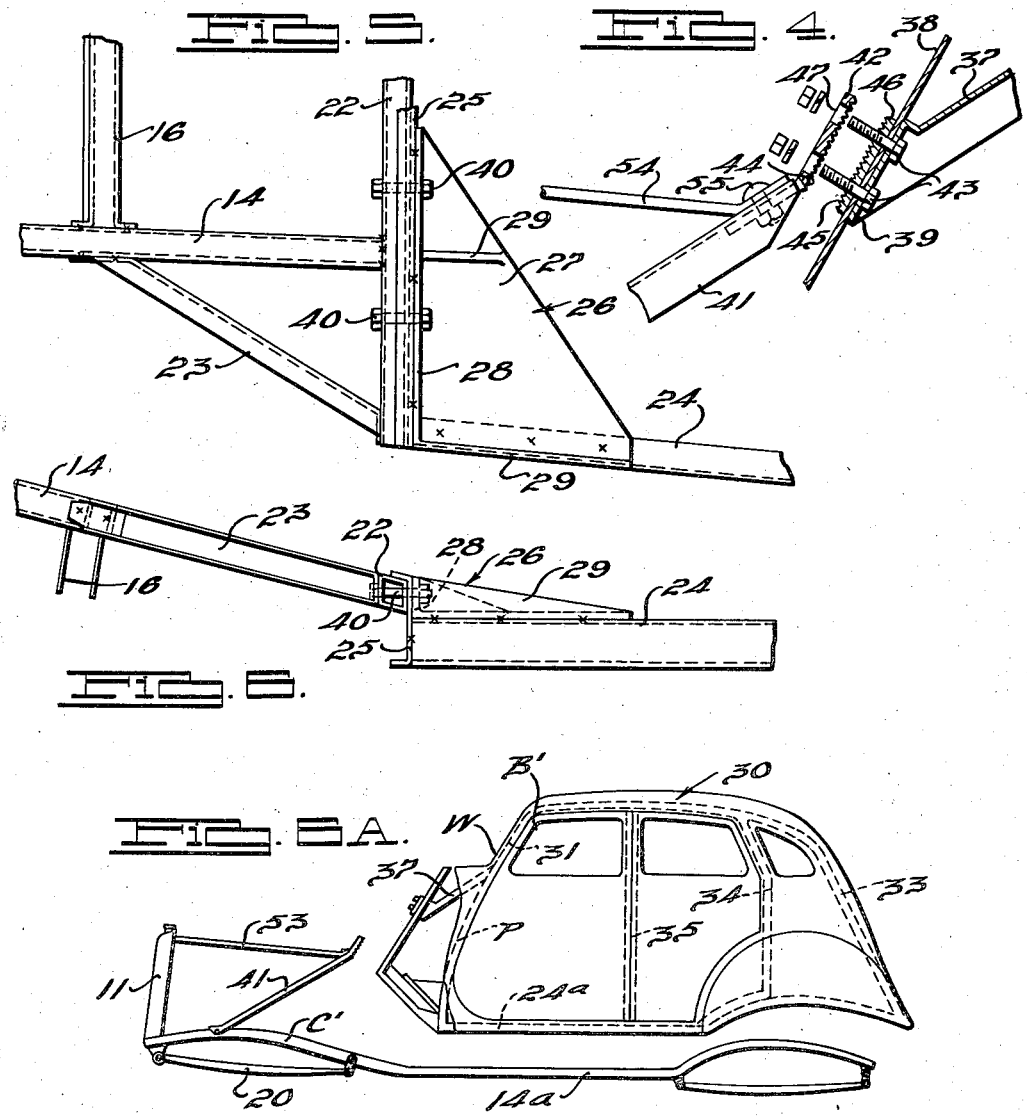
INVENTOR.
Harold A. Hicks.
BY
ATTORNEYS.

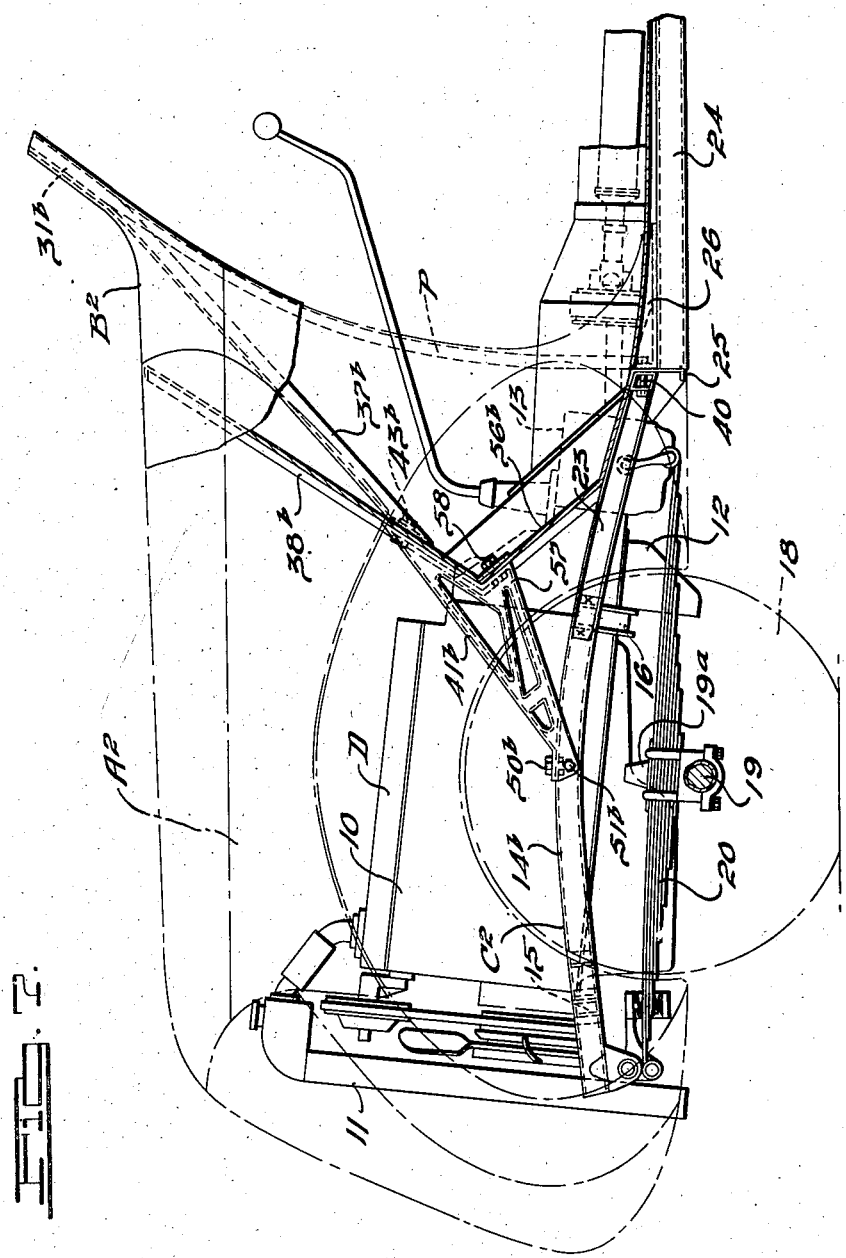

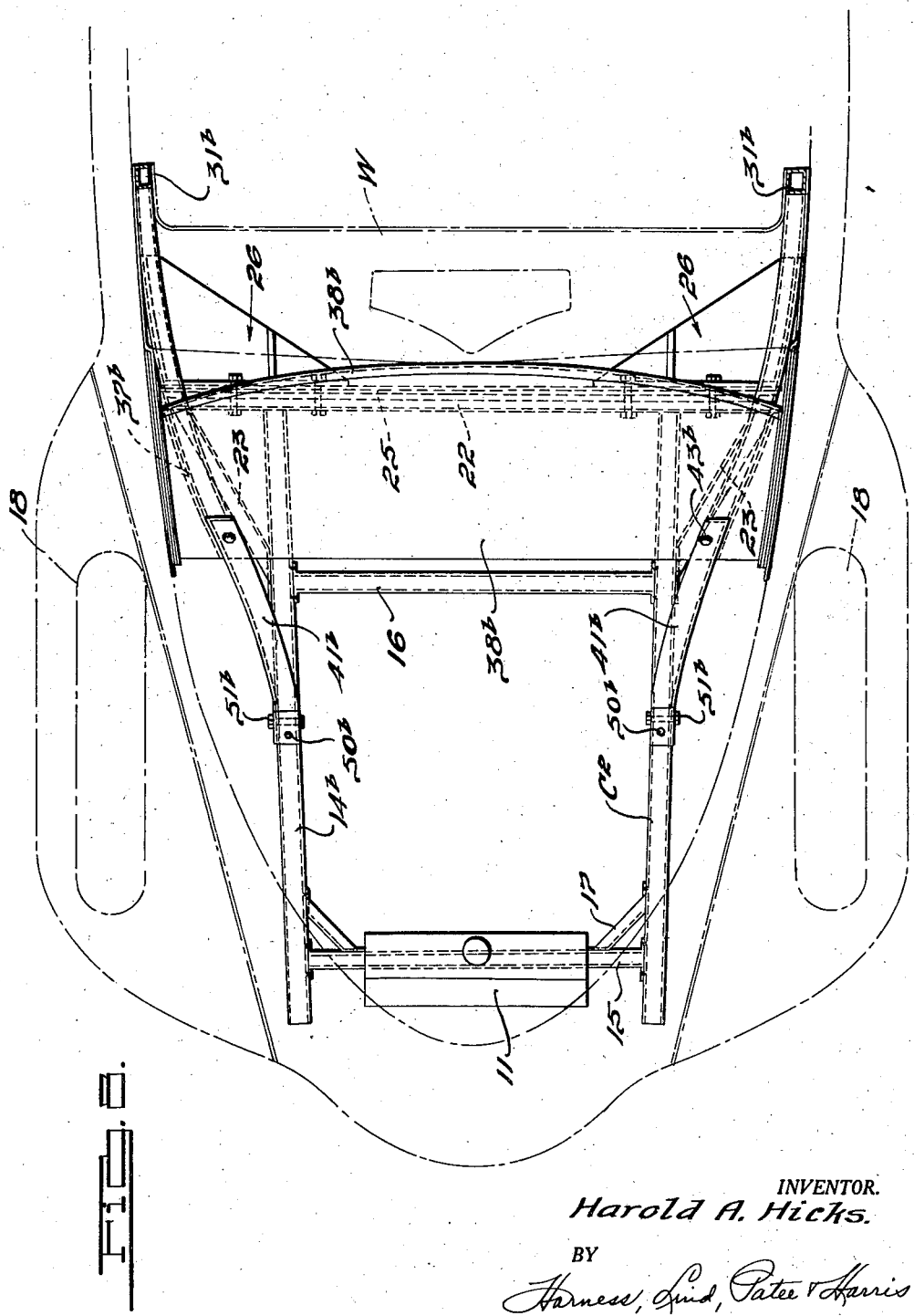

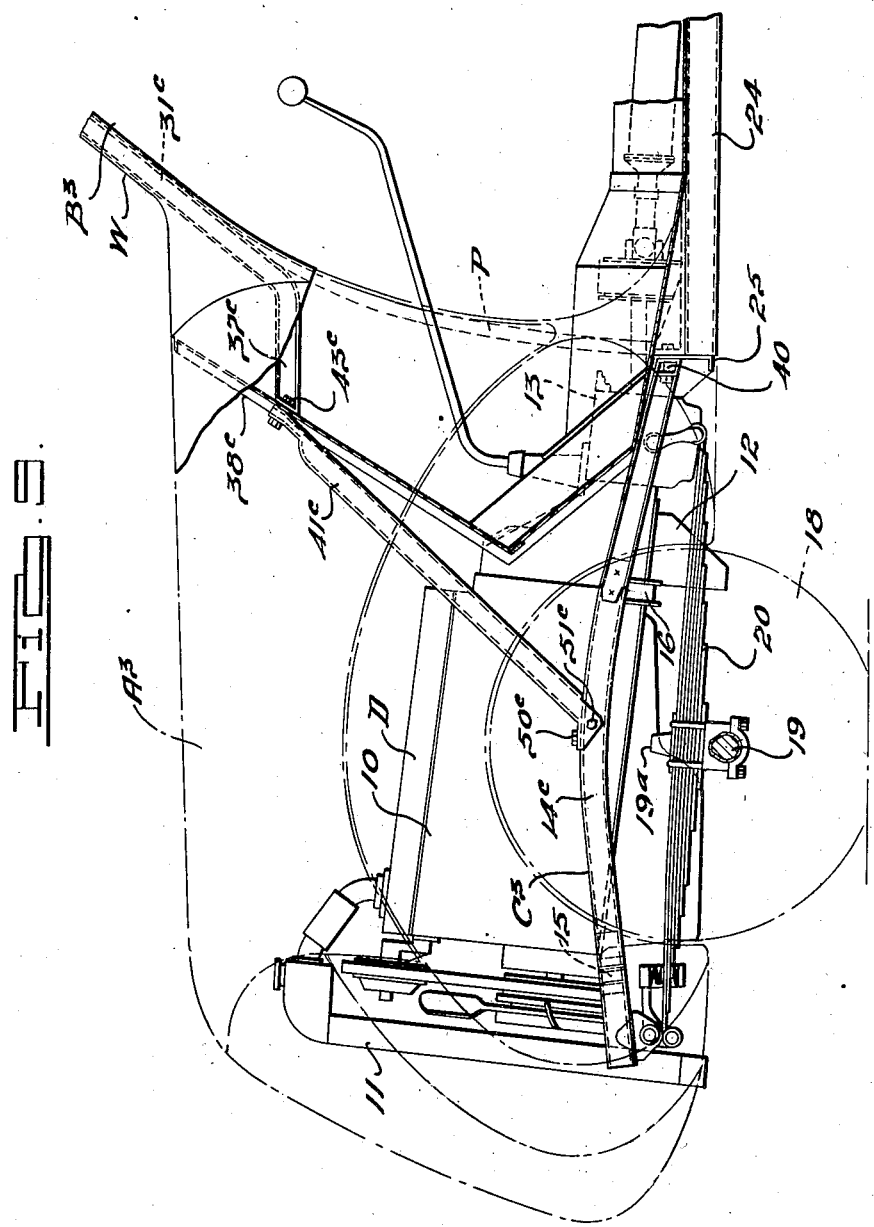

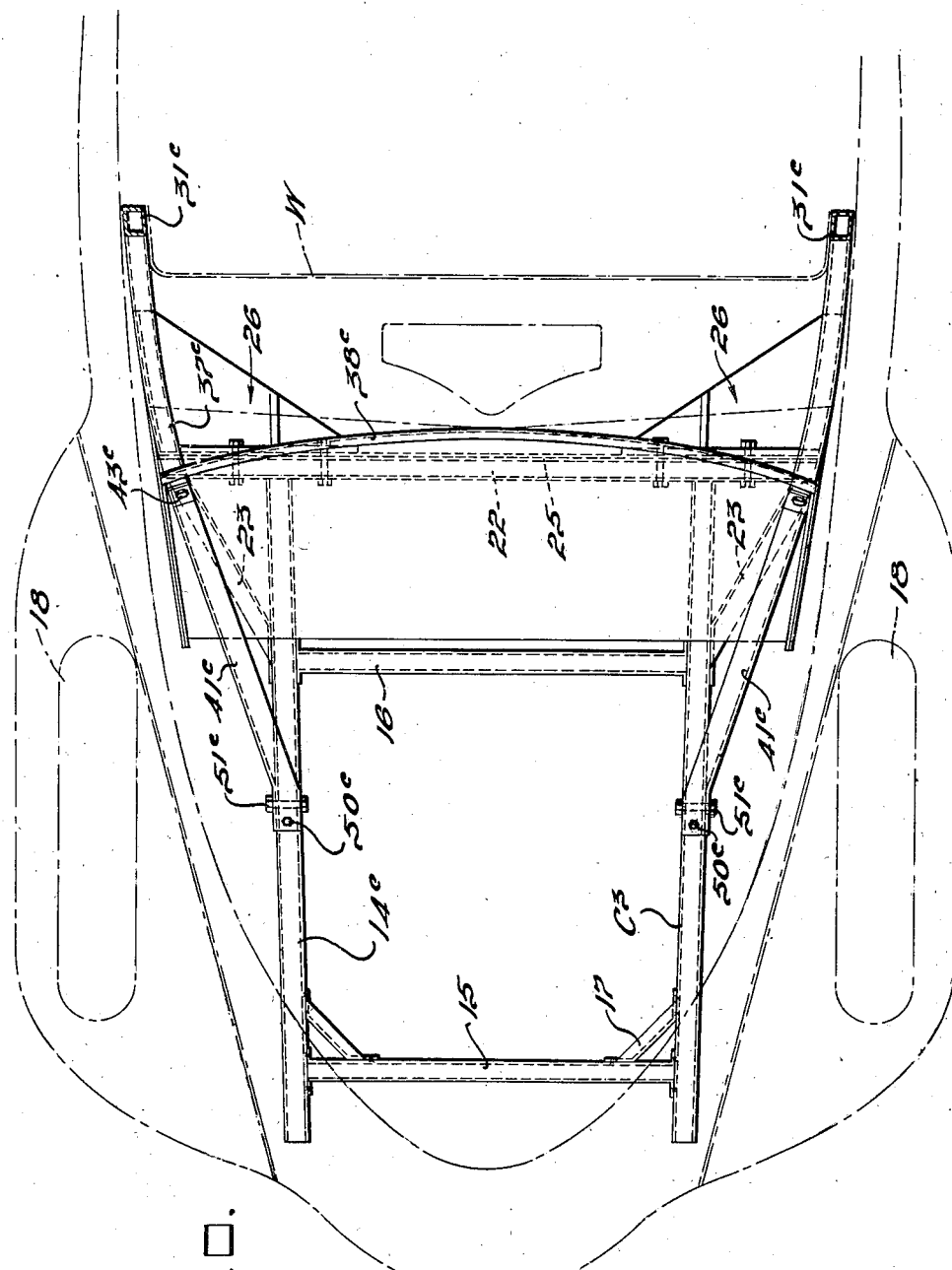

Patented Dec. 13, 1938

2,139,750

UNITED STATES PATENT OFFICE 2,139,750

MOTOR VEHICLE

Harold A. Hicks, Detroit, Mich., assignor to Chrysler Corporation, Highland Park, Mich., a corporation of Delaware Application October 21, 1935, Serial No. 45,877

23 Claims. (Cl. 296—28)

This invention relates to vehicles and refers more particularly to improvements in motor vehicles.

One object of my invention is to provide an improved motor vehicle of relatively light weight and having improved characteristics of strength and rigidity.

A further object of my invention is to provide an improved body and frame structure arranged to efficiently absorb and distribute the stresses incident to the motor vehicle load and road shocks.

Another object of my invention is to provide improved means for transferring a portion of the load at the front of the vehicle directly to the body structure enabling the use of a light frame structure of great strength.

I preferably provide struts between the front portion of the frame, in proximity to the front wheel load supports, and the front door columns so that the stresses at the forward end of the frame are transferred through the struts to the columns and roof rails which exend rearwardly from the columns near the top of the vehicle body structure. As an important feature of this part of my invention, these struts are removable for ease of assembly and replacement.

An additional object of my invention, in its more limited aspects, is to provide a removable front end vehicle unit capable of attachment during assembly with the main body portion of the vehicle. This unit preferably supports the power plant, front wheel assemblies, and parts incident thereto. The body unit preferably is a composite structure of built-up frame and body but may, if desired, comprise a body separately attached to a chassis frame. This type of multiple unit construction eliminates the present long chassis assembly line since the vehicle is divided into two main parts, the body unit and the power plant unit. The front and rear ends may be assembled or built-up more efficiently and economically since they are more accessible and more easily handled. By reason of my invention the vehicle is less costly to fabricate, assemble, service, repair and ship. While many of the improvements incident to my invention may be realized by extending the vehicle frame for the full length of the car, I preferably provide for an improved fabrication or connection between the front and rear frame portions whether the body is attached to the rear frame portion or built-up as a unitary structure therewith.

An additional object of my invention is to provide an improved vehicle frame structure having a pair of truss-like side structures. Each of these side structures comprises a compression resisting roof rail having forwardly and rearwardly sloping compression resisting structural extensions structurally connected by a chordal means of the truss. The roof rail sloping forward extensions each preferably comprises a windshield-forming post extended structurally by a strut structure connected at the lower end to a chordal means while the roof rail sloping rearward extensions are also connected structurally to such chordal means. In the several illustrated embodiments of my invention each strut structure is removably secured at the lower end thereof to a chordal means and at the upper end to a transversely reinforcing dash for the side trusses, each strut structure thrusting at its dash-connected upper end to a windshield post through the intermediary to a structural extension of the windshield post disposed within the body cowl rearwardly of the dash. The chordal means for each of the truss-like side structures comprises a body bottom side sill, which constitutes beam-forming means at the bottom of the body structure, and a power plant supporting frame which projects forwardly of the bottom side sills. In certain instances the power plant supporting frame may comprise the forward end of a chassis frame which extends substantially the length of the vehicle. In the latter case, each chordal means is provided by beam-forming means comprising a longitudinal side rail of the chassis supplemented, if desired, by body bottom side sills.

Further objects and advantages of my invention reside in the novel combination and arrangement of parts as more particularly hereinafter set forth, reference being had to the accompanying drawings which illustrate several embodiments of my invention and in which:

Fig. 1 is a side elevational view of my motor vehicle formed in front and rear units, the units being illustrated relatively separated with parts of the vehicle broken away to show the connecting means.

Fig. 2 is an enlarged sectional elevational view of the forward portion of the vehicle body and frame.

Fig. 3 is a top plan view of the body and frame structure illustrated in Fig. 2.

Fig. 4 is an enlarged detail sectional view taken along line 4—4 of Fig. 3.

Fig. 5 is a top plan view of the connected portions of the frame of the front and rear vehicle units.

Fig. 6 is a side elevational view of the Fig. 5 structure.

Fig. 6A is a side elevational view showing a modified form of my invention wherein a chassis frame is adapted to mount the body unit, the view showing the frame and body separated.

Fig. 7 is a view corresponding to Fig. 2 but illustrating a further modified construction.

Fig. 8 is a top plan view of the Fig. 7 structure.

Fig. 9 is a view corresponding to Figs. 2 and 7 but illustrating a further modified construction.

Fig. 10 is a top plan view of the Fig. 9 structure.

Fig. 11 is a plan diagrammatic view of a modified structure of frame for a front unit.

Referring to the drawings, I have illustrated my invention in Figs. 1 to 6 as comprising a forward unit A and a rear unit B. In this embodiment of my invention the front unit preferably embodies a frame structure C adapted to support the power plant D which, as is now customary, may comprise engine 10, radiator 11, clutch 12, and transmission 13.

Frame C is suitably fabricated and preferably has the main side longitudinal rails 14 of downwardly opening channel form, connected at suitable points by the cross members 15, 16 for bracing the side rails and supporting the power plant. For added strength, corner braces 17 are preferably secured between rails 14 and cross brace 15, the various members being welded or otherwise rigidly joined together. Frame C is yieldingly supported on the steerable ground wheels 18 by any appropriate means such as axle 19 and the side spring assemblies 20. While other suitable forms of wheel suspensions may be employed, if desired, my illustrated suspension provides the aforesaid side spring assemblies 20, each having its longitudinally extending ends shackled to a side rail 14 to provide a pair of longitudinally spaced front wheel frame supports at each side of frame C. A rubber bumper 19ª strikes a rail 14 to yieldingly limit movement of axle 19 toward frame C. The power plant is enclosed by a hood structure 21 adapted to conform with the forwardly projecting cowl paneling of rear unit B as will presently be more apparent.

The rear ends of rails 14, where the chassis rails do not extend the length of the vehicle, are connected by welding to a cross member 22 of box-like formation, the rails 14 being preferably set inwardly from the ends of rear cross member 22. Channeled corner braces 23 connect the ends of member 22 to rails 14.

The body unit B is somewhat diagrammatically shown in Fig. 1 as a four door sedan style although it will be understood that various body styles may be employed. This unit is illustrated as comprising a built-up composite frame and body having beam-forming means at the bottom of the body, preferably in the form of bottom side sills 24 connected at their front ends by welding to a forwardly opening relatively deep channeled cross member 25. The web of member 25 extends upwardly beyond the forward ends of sills 24 and these connections are braced by brackets 26, each having a web 27 welded to the upper face of a sill 24 and a vertical flange 28 welded to the upwardly extending portion of cross member 25. Each bracket is stiffened by vertical webs 29 extending between flange 28 and web 27.

The unit B, in addition to the sills 24, is further provided with compression resisting top longitudinals or rails of any suitable fabrication, these top members being generally designated at 30 and preferably extending rearwardly from the windshield corner posts 31 to receive the load at or in proximity to the rear wheel spring supports 32 through the frame portions 33 and 34. A further brace 35 connects intermediate portions of each sill 24 and a top rail 30, the vertical braces 34, 35 serving as door posts while top rails 30 support the usual body roof.

The forward ends of sills 24 and rails 30 may be further connected by a front door column or post P of any well known structure rearwardly adjacent the cowl structure 36, each roof rail 30 extending forwardly and downwardly to provide the aforesaid post 31, the latter then further extending forwardly and downwardly by a channeled cowl portion or cowl strut 37 adapted for connection, preferably by welding, to the transversely extending dash structure 38. To this end, the forwardly terminating end of each rail portion 37 (see Figs. 2 and 4) is formed with a securing web 39 fashioned to lie parallel to, and in engagement with, the dash 38. It will be noted that posts 31 branch near the bottom of the windshield W to provide columns P and forwardly extending windshield post projections 37. Columns P may be made of relatively light structural formation of any suitable fabrication.

In order to removably connect units A and B to provide a rigid structure, the cross member 22 is bolted at 40, at each side of frame C, to the body cross member 25, the bolts preferably also passing through flanges 28 of brackets 26. This connection, together with braces 23, provides a structural assembly for rigidly joining rails 14 and sills 24 so that these members are structurally continuous.

In order to complete the truss-like body structure so that a portion of the load at rails 14 is transmitted during normal loading conditions directly to the roof rails 30, I have provided a channeled compression strut 41 at each side of the vehicle. Each strut is structurally connected at its lower end to a rail 14 and at its upper end to dash 38. While struts 41 may be built into the vehicle as extensions of rail portions 37, it is a feature of my invention in a more limited aspect to provide for the removability of struts 41 so that they are readily replaceable in case of accident, to facilitate installation and repair of the power plant including engine 10, and to facilitate assembly and manufacture of the vehicle especially where units A and B are adapted for separate assembly.

With the foregoing in view, the upper ends of struts 41 are angled at 42 parallel to dash 38 for removable connection thereto by one or more bolts 43 which also extend through webs 39 of rail cowl portions 37. As a means of readily aligning the parts and holding them in rigid removable connection, the rear face of each strut end 42 is serrated at 44 to engage corresponding serrations 45 of a plate 46 welded to dash 38. Bolts 43 extend through each plate 46 and strut end 42, the latter having elongated bolt-receiving holes 47 providing clearance with the bolts sufficient to accommodate a range of assembly adjustment between strut end 42 and plate 46.

It will be noted that each strut 41 is structurally continuous with the associated rail portion 37 so that loads transferred through the struts pass directly to the roof rails. The struts 41 slope forwardly and downwardly, preferably in axial alignment with rail portions 37 for connection with the rails 14 respectively. In the Fig. 2 embodiment, the struts connect with the rails near their forward ends, each strut having its terminal web 48 and side flanges 49 secured in place by fasteners 50 and 51 respectively.

By reason of such arrangement, much of the bending in rails 14 caused by the vertical load through the supports for springs 20 is taken by the strut 41 acting in compression and transferring this load portion directly through rail portions 37, 31 thence along the main portions of roof rails 30 to the sills or bottom rails 24 through brace structures 33, 34 and 35. Wheel shock loads on frame C will be similarly distributed in part through the body structure as well as head-on collision forces.

In order to brace the radiator assembly 11, the latter has a bracket 52 connected by the rearwardly diverging braces 53, 54 which respectively extend to the struts 41. A fastener 55 connects a brace to a strut so that for assembly or removal of units A and B only the strut fasteners 43 need be secured or removed as the case may be, the brace fasteners 55 remaining in position.

By reason of the foregoing arrangement of parts, I have provided a truss-like structure at each side of the vehicle. Each truss comprises a roof rail 30 with its forwardly and downwardly inclined compression resisting structural extensions 31, 37, 41, and with its rearwardly and downwardly inclined structural extension 33. Each truss has a lower chordal means which, in the foregoing embodiment, comprises frame C and a sill 24. Each truss has the component struts 34, 35, P; together with dash 38 and cowl structure 36 which also rigidify the body structure and tie the front portions of the struts transversely together.

Referring now to the modification illustrated in Fig. 6A, the body unit B' is similar to body unit B except that it is constructed for mounting on a chassis frame C' which extends substantially the length of the vehicle. In this instance, chassis frame rails 14ª support the body sills 24ª which are built into the body unit. The vehicle is otherwise as shown and described in the embodiment illustrated in Figs. 1 to 6, as noted by the similar reference characters. In this instance the lower chordal means for each side truss is provided by a rail 14ª supplemented rearwardly of column P by a body sill 24ª.

In the embodiment of my invention illustrated in Figs. 7 and 8, the following differences occur over the embodiment illustrated in Figs. 1 to 6. The body unit B² has its top rails formed with corresponding windshield corner posts 31ᵇ but these now have a greater inclination as to their cowl extension portions 37ᵇ. These extensions are secured by fasteners 43ᵇ to the struts 41ᵇ adjacent the intersection of dash 38ᵇ with the toe-board 56ᵇ. Each strut has a shoulder portion 57 secured by a fastener 58 to the toe-board so that the latter is supported by the struts. The toe-board is thus structurally connected with the parts to which the struts are connected, thereby further adding to the rigidity of the assembly.

Each strut 41ᵇ is connected by fasteners 50ᵇ 51ᵇ to a rail 14ᵇ of the front unit A², it being noted that the rail connection is at the point where bumper 19ª strikes the rail 30 so that this shock load is largely transmitted directly through a strut to the body top rail. Such arrangement also provides for a larger amount of the bending in the rails aft of the strut connections to be transferred in compression through the struts.

The arrangement in Fig. 7 has the advantage over the Fig. 2 arrangement, in reference to the location of the points of connection between the struts and frame rails, in that the struts of Fig. 7 directly take the load of bumper 19ª thereby relieving the frame of this load. This frame C² of Fig. 7 may therefore be made relatively light weight with resulting saving in cost.

Referring to Figs. 9 and 10, the following differences occur over the embodiment of Figs. 1–6. The struts 41ᶜ of front section A³ are channelled inwardly and extend from fasteners 43ᶜ at dash 38ᶜ for connection by fasteners 50ᶜ, 51ᶜ to rails 14ᶜ of frame C³ at the locations illustrated in the Fig. 7 embodiment.

The rear or body unit B³ has its roof rails extending downwardly to form the side windshield posts 31ᶜ, the latter extending forwardly through the angled rail cowl portions 37ᶜ to the dash fasteners 43ᶜ. In this instance the load transference from the struts 41ᶜ to the body roof rails is not in as direct a line of thrust as is the case of the aforesaid embodiments of my invention.

In each of the embodiments of my invention the body structure provides for the accommodation of passengers, a driver's compartment being formed rearwardly of the dash at the forward end portion of the body.

In Fig. 11 the frame C⁴ may, if desired, be employed instead of the corresponding frames of the other embodiments of my invention. This frame has its side rails 14ᵈ connected by cross members 15ᵈ and 22ᵈ, the latter in this instance providing the support for the rear of the power plant. The corner braces 17ᵈ and 23ᵈ are approximately axially aligned, the braces 17ᵈ closely approaching each other at cross member 15ᵈ, this arrangement providing for great rigidity and light weight. It will be understood that the frame C⁴ is adapted to support the power plant as hereinbefore described and may be attached as a unit to the rear body unit or the frame may be extended rearwardly as in Fig. 6A to provide a chassis for receiving a body. The inclined struts are adapted for attachment to rails 14ᵈ as indicated at points 50ᵈ as in Figs. 7 and 9 or forwardly thereof as in Fig. 2.

What I claim is:

1. In a motor vehicle, a body structure providing a driver's compartment, an engine supporting frame extending forwardly from said compartment, pairs of front wheel supports, the supports of each pair being spaced longitudinally from each other on opposite sides of said frame, said body structure including longitudinally extending compression resisting roof rails at each side thereof, each of said roof rails having a forwardly and downwardly extending windshield post, a strut member structurally connecting each of said windshield posts with said frame at each side thereof, each of said strut members extending from said frame at a point intermediate one of said pairs of wheel supports and inclining upwardly and rearwardly toward one of said windshield posts, a dash structure extending transversely of the vehicle, each of said windshield posts having a forwardly extending portion thereof connected to said dash, and means for securing the upper ends of said strut members to said dash.

2. In a motor vehicle, separable units thereof, one of said units comprising a frame structure adapted to support the power plant, the other of said units comprising a body structure, means for removably connecting said structures together, said connecting means including a strut at each side of the vehicle rising upwardly and rearwardly from said frame structure for connection to said body structure, means connecting the upper ends of said struts to said body structure, a radiator supported by said frame structure at the forward end thereof, a brace member between the upper end of one of said struts and the top portion of said radiator, and means connecting an end of said brace member to the last said strut independently of said strut and body structure connecting means.

3. In a motor vehicle, a body structure having side roof beams extending downwardly at the front side corners thereof to provide side windshield posts, said body structure having a transverse dash and a toe board extending rearwardly and downwardly from the bottom of said dash, an engine supporting frame extending forwardly of said body structure and including longitudinally extending side rails, and a strut rising upwardly and rearwardly from each of said side rails for structural connection to said dash, said windshield posts having forwardly and downwardly projecting extensions structurally connected to said dash, each of said struts having a shoulder portion thereof disposed substantially in the plane of said toe-board and connected thereto.

4. In a motor vehicle having a body structure and an engine supporting frame structure projecting forwardly from the body structure, said frame structure including a pair of longitudinally extending side rails, a brace transversely connecting the forward end portions of said rails, a second brace transversely connecting said rails rearwardly of said first brace, said rear brace having ends projecting laterally beyond said rails respectively, an oblique brace between each of said rails and an outer projecting end of said rear brace, an oblique brace between each of said rails and said front brace, said body having side sills respectively spaced outwardly from said side rails and having their forward ends respectively structurally connected to said projections of said rear brace, and an inclined strut extending between each of said rails and said body structure.

5. In a motor vehicle, a closed body structure having a longitudinally extending roof rail and a longitudinally extending bottom rail at each side of the body, the forward end of each of said roof rails extending downwardly to connect with a bottom rail for providing a windshield post and door column, said body structure further including a cowl structure extending forwardly of said door columns, said cowl structure including a transversely extending dash panel, an engine supporting frame comprising a pair of transversely spaced longitudinally extending rails projecting forwardly of said bottom body rails to substantially the forward end of the vehicle, a cowl strut at each side of the vehicle disposed within said cowl structure and having its forward end secured to the inner rear face of said dash panel, said cowl struts sloping upwardly and rearwardly for connection with said door columns respectively, a second strut at each side of the vehicle rigidly secured to one of said frame rails, each of said second struts inclining upwardly and rearwardly and having its rear end terminating adjacent the outer forward face of said dash panel, means for removably securing said rear ends of said second struts to said dash panel respectively at the points of attachment of said cowl struts to said dash panel, said second struts and said cowl struts having their respective longitudinal axes disposed substantially in alignment at each side of the vehicle and so constructed and arranged as to transmit load thrust therethrough from said frame rails to said door columns and roof rails.

6. In a motor vehicle, a closed body structure having a longitudinally extending roof rail and a longitudinally extending bottom rail at each side of the body, the forward end of each of said roof rails extending downwardly to connect with a bottom rail for providing a windshield post and door column, said body structure further including a cowl structure extending forwardly of said door columns, said cowl structure including a transversely extending dash panel, an engine supporting frame comprising a pair of transversely spaced longitudinally extending rails projecting forwardly of said bottom body rails to substantially the forward end of the vehicle, a cowl strut at each side of the vehicle disposed within said cowl structure and having its forward end secured to the inner rear face of said dash panel, said cowl struts sloping upwardly and rearwardly for connection with said door columns respectively, a second strut at each side of the vehicle rigidly secured to one of said frame rails, each of said second struts inclining upwardly and rearwardly and having its rear end terminating adjacent the outer forward face of said dash panel, means for removably securing said rear ends of said second struts to said dash panel respectively at the points of attachment of said cowl struts to said dash panel, said second struts and said cowl struts having their respective longitudinal axes disposed substantially in alignment at each side of the vehicle and so constructed and arranged as to transmit load thrust therethrough from said frame rails to said door columns and roof rails, the rear ends of said frame rails terminating adjacent the forward ends of said bottom body rails, and means for removably securing said adjacent ends of said frame rails and bottom body rails rigidly together, said removable securing means for said second struts and for said frame rails accommodating removal of said body structure with respect to said frame structure and with respect to said second struts.

7. In a motor vehicle, a closed body structure having a longitudinally extending bottom rail at each side of the body, the forward end of each of said roof rails extending downwardly to connect with a bottom rail for providing a windshield post and door column, said body structure including a cowl structure extending forwardly of said door columns, said cowl structure including a transversely extending dash panel, an engine supporting frame comprising a pair of transversely spaced longitudinally extending rails projecting forwardly of said bottom body rails to substantially the forward end of the vehicle, a cowl strut at each side of the vehicle disposed within said cowl structure and having its forward end secured to the inner rear face of said dash panel, said cowl struts sloping upwardly and rearwardly for connection with said door columns respectively, a second strut at each side of the vehicle rigidly secured to one of said frame rails, each of said second struts inclining upwardly and rearwardly and having its rear end terminating adjacent the outer forward face of said dash panel, means for removably securing said rear ends of said second struts to said dash panel respectively at the points of attachment of said cowl struts to said dash panel, said second struts and said cowl struts having their respective longitudinal axes disposed substantially in alignment at each side of the vehicle and so constructed and arranged as to transmit load thrust therethrough from said frame rails to said door columns of roof rails, said frame rails extending longitudinally rearwardly to substantially the rear end of said vehicle to support said bottom body rails.

8. In a motor vehicle, a closed body structure having a longitudinally extending roof rail and a longitudinally extending bottom rail at each side of the body, the forward end of each of said roof rails extending downwardly to connect with a bottom rail for providing a windshield post and door column, said body structure further including a cowl structure extending forwardly of said door columns, said cowl structure including a transversely extending dash panel, an engine supporting frame comprising a pair of transversely spaced longitudinally extending rails projecting forwardly of said bottom body rails to substantially the forward end of the vehicle, a cowl strut at each side of the vehicle disposed within said cowl structure and having its forward end secured to the inner rear face of said dash panel, said cowl struts sloping upwardly and rearwardly for connection with said door columns respectively, a second strut at each side of the vehicle rigidly secured to one of said frame rails, each of said second struts inclining upwardly and rearwardly and having its rear end terminating adjacent the outer forward face of said dash panel, means for removably securing said rear ends of said second struts to said dash panel respectively at the points of attachment of said cowl struts to said dash panel, said second struts and said cowl struts having their respective longitudinal axes disposed substantially in alignment at each side of the vehicle and so constructed and arranged as to transmit load thrust therethrough from said frame rails to said door columns and roof rails, a radiator assembly mounted on the forward end of said engine supporting frame, and braces respectively connecting the top portion of said radiator with said second struts independently of said securing means for the rear ends of said second struts.

9. In a motor vehicle, a body structure providing a driver's compartment, an engine supporting frame extending forwardly from said compartment, pairs of front wheel supports, the supports of each pair being spaced longitudinally from each other on opposite sides of said frame, said body structure including longitudinally extending compression resisting roof rails at each side thereof, each of said roof rails having a forwardly and downwardly extending windshield post, a strut member structurally connecting each of said windshield posts with said frame at each side thereof, each of said strut members extending from said frame at a point intermediate one of said pairs of wheel supports and inclining upwardly and rearwardly toward one of said windshield posts, each of said roof rails having a rearwardly and downwardly sloping compression resisting structural extension, and beam-forming means structurally connecting the lower end of each of said rearwardly sloping roof rail extensions with said frame at each side of the body structure adjacent the bottom thereof, an upright door post at each side of said body structure structurally connecting one of said beam-forming means at a point intermediate the length thereof with one of said roof rails intermediate the length thereof, each of said roof rails with its forward and rearward extensions and associated strut member forming in conjunction with one of said door posts a truss-like structure having said frame and one of said beam forming means as the lower chord thereof.

10. In a motor vehicle, a body structure providing a driver's compartment, an engine supporting frame extending forwardly from said compartment, pairs of front wheel supports, the supports of each pair being spaced longitudinally from each other on opposite sides of said frame, said body structure including longitudinally extending compression resisting roof rails at each side thereof, each of said roof rails having a forwardly and downwardly extending windshield post, a strut member structurally connecting each of said windshield posts with said frame at each side thereof, each of said strut members extending from said frame at a point intermediate one of said pairs of wheel supports and inclining upwardly and rearwardly toward one of said windshield posts, said strut members having their longitudinal axes disposed substantially parallel with said windshield posts respectively, each of said roof rails having a rearwardly and downwardly sloping compression resisting structural extension, and beam-forming means structurally connecting the lower end of each of said rearwardly sloping roof rail extensions with said frame at each side of the body structure adjacent the bottom thereof, an upright door post at each side of said body structure structurally connecting one of said beam-forming means at a point intermediate the length thereof with one of said roof rails intermediate the length thereof, each of said roof rails with its forward and rearward extensions and associated strut member forming in conjunction with one of said door posts a truss-like structure having said frame and one of said beam-forming means as the lower chord thereof.

11. In a motor vehicle, a body structure providing a driver's compartment, an engine supporting frame extending forwardly from said compartment, pairs of front wheel supports, the supports of each pair being spaced longitudinally from each other on opposite sides of said frame, said body structure including longitudinally extending compression resisting roof rails at each side thereof, each of said roof rails having a forwardly and downwardly extending windshield post, each of said windshield posts having a strut extension thereof projecting forwardly and downwardly therefrom at each side of said body structure, a strut member structurally connecting each of said windshield post struts with said frame at each side thereof, each of said strut members extending from said frame at a point intermediate one of said pairs of wheel supports and inclining upwardly and rearwardly toward one of said windshield post struts, said strut members having their longitudinal axes disposed in approximate alignment with said windshield post struts respectively whereby to transmit thrusts axially therebetween, each of said roof rails having a rearwardly and downwardly sloping compression resisting structural extension, beam-forming means structurally connecting the lower end of each of said rearwardly sloping roof rail extensions with said frame at each side of the body structure adjacent the bottom thereof, an upright door post at each side of said body structure structurally connecting one of said beam-forming means at a point intermediate the length thereof with one of said roof rails intermediate the length thereof, each of said roof rails with its forward and rearward extensions and associated strut member forming in conjunction with one of said door posts a truss-like structure having said frame and one of said beam-forming means as the lower chord thereof, and means for rigidly connecting said truss-like structures to each other to provide torsional rigidity for the forward portion of said body structure comprising a transversely extending dash structure connecting together at least one of said struts at each side of said body structure.

12. In a motor vehicle, a body structure providing a driver's compartment, an engine supporting frame extending forwardly from said compartment, said body structure including longitudinally extending compression resisting roof rails at each side thereof, each of said roof rails having a forwardly and downwardly extending windshield post, a cowl structure providing the forward end of said driver's compartment, said windshield posts each having a forwardly extending strut portion thereof within said cowl structure, a strut member structurally connecting each of said windshield post strut extensions with said frame at each side thereof, each of said strut members extending from said frame at an inclination upwardly and rearwardly toward one of said windshield post strut extensions, each of said roof rails having a rearwardly and downwardly sloping compression resisting structural extension, beam-forming means structurally connecting the lower end of each of said rearwardly sloping roof rail extensions with said frame at each side of the body structure adjacent the bottom thereof, an upright door post at each side of said body structure structurally connecting one of said beam-forming means at a point intermediate the length thereof with one of said roof rails intermediate the length thereof, each of said roof rails with its forward and rearward extensions and associated strut member forming in conjunction with one of said door posts a truss-like structure having said frame and one of said beam-forming means as the lower chord thereof, and means for rigidly connecting said truss-like structures to each other to provide torsional rigidity for the forward portion of said body structure comprising a transversely extending dash structure connecting together each of said windshield post strut extensions.

13. In a motor vehicle, a body structure providing a driver's compartment, an engine supporting frame extending forwardly from said compartment, said body structure including longitudinally extending compression resisting roof rails at each side thereof, each of said roof rails having a forwardly and downwardly extending windshield post, a cowl structure providing the forward end of said driver's compartment, said windshield posts each having a downwardly and forwardly extending strut portion thereof within said cowl structure, a strut member structurally connecting each of said windshield post strut extensions with said frame at each side thereof, each of said strut members extending from said frame an inclination upwardly and rearwardly toward one of said windshield post strut extensions, said strut members having their longitudinal axes respectively disposed in approximate alignment with said windshield post strut extensions, each of said roof rails having a rearwardly and downwardly sloping compression resisting structural extension, beam-forming means structurally connecting the lower end of each of said rearwardly sloping roof rail extensions with said frame at each side of the body structure adjacent the bottom thereof, an upright door post at each side of said body structure structurally connecting one of said beam-forming means at a point intermediate the length thereof with one of said roof rails intermediate the length thereof, each of said roof rails with its forward and rearward extensions and associated strut member forming in conjunction with one of said door posts a truss-like structure having said frame and one of said beam-forming means as the lower chord thereof, and means for rigidly connecting said truss-like structures to each other to provide torsional rigidity for the forward portion of said body structure comprising a transversely extending dash structure connecting together each of said strut members and each of said windshield post strut extensions.

14. In a motor vehicle, a body structure providing a driver's compartment, an engine supporting frame extending forwardly from said compartment, said body structure including longitudinally extending compression resisting roof rails at each side thereof, each of said roof rails having a forwardly and downwardly extending windshield post, said windshield posts each branching adjacent the bottom of the windshield to provide a door column at the front of said compartment and a forwardly disposed post strut extension, an inclined strut member structurally connecting each of said post strut extensions with said frame at each side thereof, each of said roof rails having a rearwardly and downwardly sloping compression resisting structural extension, and beam-forming means structurally connecting the lower end of each of said rearwardly sloping roof rail extensions with said frame at each side of the body structure adjacent the bottom thereof, an upright door post at each side of said body structure structurally connecting one of said beam-forming means at a point intermediate the length thereof with one of said roof rails intermediate the length thereof, each of said roof rails with its forward and rearward extensions and associated strut member forming in conjunction with one of said door posts a truss-like structure having said frame and one of said beam-forming means as the lower chord thereof, and means for rigidly connecting said truss-like structures together to provide torsional rigidity for the forward portion of said body structure comprising a transversely extending dash structure, said dash structure connecting the upper ends of said strut members respectively to the forward ends of said post strut extensions.

15. In a motor vehicle, a body structure providing a driver's compartment, an engine supporting frame extending forwardly from said compartment, pairs of front wheel supports, the supports of each pair being spaced longitudinally from each other on opposite sides of said frame, said body structure including longitudinally extending compression resisting roof rails at each side thereof, each of said roof rails having a forwardly and downwardly extending windshield post, said windshield posts each branching adjacent the bottom of the windshield to provide a door column at the front of said compartment and a downwardly and forwardly disposed post extension, an inclined strut adapted to structurally connect each of said post extensions with said frame at each side thereof at a point intermediate one of said pairs of wheel supports, means including a transverse dash panel for structurally connecting the upper end of said struts to the forward ends respectively of said post extensions, each of said roof rails having a rearwardly and downwardly sloping compression resisting structural extension, and beam-forming means structurally connecting the lower end of each of said rearwardly sloping roof rail extensions with said frame at each side of the body structure adjacent the bottom thereof, an upright door post at each side of said body structure structurally connecting one of said beam-forming means at a point intermediate the length thereof with one of said roof rails intermediate the length thereof, each of said roof rails with its forward and rearward extensions and associated strut member forming in conjunction with one of said door posts a truss-like structure having said frame and one of said beam-forming means as the lower chord thereof.

16. In a motor vehicle, separable units thereof, one of said units comprising a frame structure adapted to support the power plant, the other of said units comprising a body structure, means for removably connecting said structures together, said connecting means including a strut at each side of the vehicle rising upwardly and rearwardly from said frame structure for connection to said body structure, said body structure including compression resisting roof rails each having a forwardly and downwardly sloping structural extension and a rearwardly and downwardly extending compression resisting extension, means removably securing the upper end of each of said struts to one of said roof rails forward extensions, and chordal means including said power plant supporting frame structure for structurally connecting the lower ends of said struts respectively with the lower portions of said roof rail rearward extensions at each side of the vehicle, an upright door post at each side of said body structure structurally connecting one of said chordal means at a point intermediate the length thereof with one of said roof rails intermediate the length thereof, each of said roof rails and extensions thereof together with an associated strut forming in conjunction with one of said door posts a truss-like vehicle side structure having said chordal means as the lower chord thereof.

17. In a motor vehicle, separable units thereof, one of said units comprising a frame structure adapted to support the power plant, the other of said units comprising a body structure having a transverse dash at the forward end thereof, means for removably connecting said structures together including a strut at each side of the vehicle inclining upwardly and rearwardly from said frame structure for connection to said dash, said body structure including compression resisting roof rails each having a forwardly and downwardly sloping structural extension and a rearwardly and downwardly extending compression resisting extension, each of said roof rail forward extensions being disposed for connection to said dash to receive thrust from one of said struts, and chordal means including said power plant supporting frame structure for structurally connecting the lower ends of said struts respectively with the lower portions of said roof rail rearward extensions at each side of the vehicle, an upright door post at each side of said body structure structurally connecting one of said chordal means at a point intermediate the length thereof with one of said roof rails intermediate the length thereof, each of said roof rails and extensions thereof together with an associated strut and chordal means being so constructed and arranged in conjunction with one of said door posts as to form a truss-like side structure for the vehicle.

18. In a motor vehicle, separable units thereof, one of said units comprising a frame structure adapted to support the power plant, the other of said units comprising a body structure having a transverse dash at the forward end thereof, means for removably connecting said structures together including a strut at each side of the vehicle inclining upwardly and rearwardly from said frame structure for connection to said dash, said body structure including compression resisting roof rails each having a forwardly and downwardly sloping structural extension and a rearwardly and downwardly extending compression resisting extension, each of said roof rail forward extensions being connected to said dash to receive thrust from one of said struts, and body sill structures removably secured to rear end portions of said power plant supporting frame structure and structurally cooperating therewith to provide truss chord structures at the sides of the vehicle respectively connecting the lower ends of said struts with the lower portions of said roof rail rearward extensions.

19. In a motor vehicle, separable units thereof, one of said units comprising a frame structure adapted to support the power plant, the other of said units comprising a body structure having a forwardly extending cowl structure terminating in a transversely extending dash structure, means for removably connecting said frame and body structures together, said connecting means including a strut member at each side of the vehicle rising upwardly and rearwardly from said frame structure for connection to said dash structure, means for removably connecting said strut members to said frame structure, said body structure including compression resisting roof rails each having a forwardly and downwardly sloping strut extension disposed within said cowl structure and terminating at said dash structure and a rearwardly and downwardly sloping compression resisting extension, means removably securing the upper end of each of said strut members to said dash structure at the juncture of one of said roof rail forward extensions, and chordal means including said power plant supporting frame structure for structurally connecting the lower ends of said strut members respectively with the lower portions of said roof rail rearward extensions at each side of the vehicle, each of said roof rails and strut extensions thereof together with an associated strut member and chordal means being so constructed and arranged as to form a truss-like side structure for the vehicle.

20. In a motor vehicle having a body structure and an engine supporting frame structure projecting forwardly from said body structure, an upwardly and rearwardly inclined brace at each side of the vehicle, means for removably connecting opposite ends of each of said braces respectively to said body and frame structures, said body structure having an arched truss-like structure at each side thereof so constructed and arranged as to resist compressive forces transmitted thereto by one of said braces, and truss chordal means including said engine supporting frame structure structurally connecting the forward ends of said braces respectively with the rearward end portions of said arched body structures.

21. In a motor vehicle, separable units thereof, one of said units comprising a frame structure adapted to support the power plant, the other of said units comprising a body structure having a forwardly extending cowl structure terminating in a transversely extending dash structure, means for removably connecting said frame and body structures together, said connecting means including a strut member at each side of the vehicle rising upwardly and rearwardly from said frame structure for connection to said dash structure, said frame structure terminating rearwardly adjacent the front end of said body structure, said body structure including compression resisting roof rails each having a forwardly and downwardly sloping strut extension disposed within said cowl structure and terminating at said dash structure and a rearwardly and downwardly sloping compression resisting extension, means removably securing the upper end of each of said strut members to said dash structure at the juncture of one of said roof rail forward extensions, and chordal means including said power plant supporting frame structure for structurally connecting the lower ends of said strut members respectively with the lower portions of said roof rail rearward extensions at each side of the vehicle, each of said roof rails and strut extensions thereof together with an associated strut member and chordal means being so constructed and arranged as to form a truss-like side structure for the vehicle.

22. In a motor vehicle, a body structure providing a driver's compartment, an engine supporting frame extending forwardly from points of attachment with the front end portion of said body structure to approximately the front end of the vehicle, said body structure including longitudinally extending compression resisting roof rails at each side thereof, each of said roof rails having a forwardly and downwardly extending windshield post, a strut member structurally connecting each of said windshield posts with said frame at each side thereof, each of said strut members inclining upwardly and rearwardly from said frame toward one of said windshield posts, each of said roof rails having a rearwardly and downwardly sloping compression resisting structural extension, and beam-forming means structurally connecting the lower end of each of said rearwardly sloping roof rail extensions with said frame at each side of the body structure adjacent the bottom thereof, an upright door post at each side of said body structure structurally connecting one of said beam-forming means at a point intermediate the length thereof with one of said roof rails intermediate the length thereof, each of said roof rails with its forward and rearward extensions and associated strut member forming in conjunction with one of said door posts a truss-like structure having said frame and one of said beam-forming means as the lower chord thereof.

23. In a motor vehicle, a body structure having a transverse dash, a power plant supporting frame extending forwardly of said dash member, said frame terminating rearwardly at the front portion of said body structure and adapted for attachment thereto, a strut rising upwardly from said frame at each side of the vehicle and inclining rearwardly toward said dash, a pair of serrated plates respectively carried at the upper ends of said struts, a second pair of serrated plates carried by said dash, the serrations of one of said pairs of plates being engageable respectively with the serrations of the other of said pairs of plates, a fastener projecting from each of the plates of one of said pairs of plates, each of the plates of the other pair having a slot adapted to receive one of said fasteners with clearance accommodating a range of assembly adjustment between said body structure and said frame.

HAROLD A. HICKS.